July 13, 1965 D. H. SCHAEFER 3,194,951

LOGARITHMIC CONVERTER

Filed May 24, 1962 3 Sheets-Sheet 1

INVENTOR

DAVID H. SCHAEFER

BY J. D. O'Brien

W. H. King

ATTORNEYS

July 13, 1965 D. H. SCHAEFER 3,194,951

LOGARITHMIC CONVERTER

Filed May 24, 1962 3 Sheets-Sheet 2

INVENTOR

DAVID H. SCHAEFER

ATTORNEYS

INVENTOR
DAVID H. SCHAEFER
BY
C. W. O'Brien
W. H. King
ATTORNEYS

United States Patent Office 3,194,951
Patented July 13, 1965

3,194,951

LOGARITHMIC CONVERTER

David H. Schaefer, Oxon Hill, Md., assignor to the United States of America as represented by the Administrator of the National Aeronautics and Space Administration Filed May 24, 1962, Ser. No. 197,553
8 Claims. (Cl. 235—154)
(Granted under Title 35, U.S. Code (1952), sec. 266)

The invention described herein may be manufactured and used by or for the Government of the United States of America for governmental purposes without the payment of any royalties thereon or therefor.

The invention relates generally to an improved converter, and more particularly to a converter for converting signals representative of a first number to signals representative of a second number which is an approximation of the logarithm of the first number.

Probes which are launched into space transmit to earth data collected from numerous experiments. The data is in the form of electric-signal pulses which represent binary bits of information (digits of binary numbers) and groups of which represent binary numbers. As probes are launched deeper into interplanetary space, the number of bits of information which can be transmitted per unit of time to earth decreases. Accordingly, it becomes essential to transmit to earth only significant data and to strain out unneeded data before it is transmitted. One of the purposes of this invention is to strain out unneeded data before it is transmitted by providing a device for converting groups of electric signal pulses, representing large binary numbers, into an equal number of groups having fewer electric signal pulses, representing smaller related binary numbers.

Prior art converters employed to compress binary numbers into binary numbers having fewer digits use what is known as the "floating point" method. One of these converters gives as its output the significant digits of the input plus other digits that indicate where the binary point should be placed. This converter receives bits of information which represent a number (four, for example) of the most significant digits of the input number, and uses these bits of information as the least significant digits of the output; and this converter also counts the bits of information which represent the total number of digits in the input number, and uses this count as the most significant digits of the output. For example, if the input binary number is "*a b c d e f g h i*," where "*a*" is a "1," then the output number will be "N *a b c d*," where N equals the total number of digits. In the example, N equals 9, which is the binary number 1001. Therefore, the output is 1001 *a b c d*. Specific examples are:

| Input | Output |
|---|---|
| 1111111111111111111 | 100111111 |
| 1000000000000000000 | 100111000 |
| 1011001110110010110 | 100111011 |
| 0000000000110000000 | 010011100 |
| 0000000000000010000 | 001011000 |

These prior art converters work well. However, as probes are launched farther from earth, it becomes necessary to further compress the data transmitted without further loss of accuracy.

It is, therefore, an object of the invention to compress binary bits of information representing data into a fewer number of binary bits of information representing the same data without an appreciable loss of accuracy.

Another object of the invention is to convert bits of information representing the digits of a number into bits of information representing the digits of another number which is an approximation of the logarithm of the first number.

A still further object of the invention is to provide an improved binary to binary logarithmic converter.

According to the present invention, the foregoing and other objects are attained by providing a binary to binary converter for converting an input number into an output number which is approximately equal to the logarithm of the input number. A nineteen to eight binary converter has been chosen to demonstrate the invention, even though different ratios of input to output can be used without departing from the spirit of the invention. Basically, as in the prior art, the converter gives as its output the significant digits of the input plus other digits that indicate where the binary point should be placed. However, the converter embodying this invention differs from the prior art in that the second, third, fourth, and fifth most significant digits of the input binary number become the four least significant digits of the output; and the binary digits of a number which is equal to the total number of digits of the input number minus four become the four most significant digits of the output. The reason that four less than the total number of digits of the input number is used is to make certain that the total number of digits of the input number can be represented by a four digit binary number. Since the input number of the converter described can have as many as nineteen digits it is necessary that this number be decreased four in order to represent it by a four digit binary number.

If the input number of the nineteen to eight converter described is "*a b c d e f g h i*," where "*a*" is "1," then the output number will be "N *b c d e*," where "N" equals the total number of digits minus four. In the example, N equals 5 which is the binary number 101. Therefore, the output is 101 *b c d e*. Specific examples are:

| | Input | Output |
|---|---|---|
| (*a*) | 1111111111111111111 | 11111111 |
| (*b*) | 1000000000000000000 | 11110000 |
| (*c*) | 1011001110110010110 | 11110110 |
| (*d*) | 0000000000110000000 | 01011000 |
| (*e*) | 0000000000000010000 | 00010000 |

In specific example (*b*) the total number of digits less four is fifteen which can be represented by the four digit binary number 1111. The second, third, fourth, and fifth most significant digits of the input number in example (*b*) are 0000. Consequently, in example (*b*) the output becomes 11110000. In specific example (*d*) the total number of digits less four is five which can be represented by the four digit binary number 0101. The second, third, fourth, and fifth most significant digits of the input number in example (*d*) are 1000. Consequently, in example (*d*) the output becomes 01011000. For input numbers with five digits or less, the converter will provide an output number simply equal to the input number. Specific examples (*a*), (*c*), and (*e*) have not been explained; however, it is obvious how the outputs are derived from the inputs in these examples.

The output of the converter by virtue of its coding indicates the value of the input to an accuracy of better and ±3% throughout its entire range. At the same time, as can be seen from the above specific examples, the converter embodying the invention gives more compression than converters using the "floating point" method. A fuller understanding of the invention may be had by referring to the following description and claims, taken in conjunction with the accompanying drawings, in which:

Figure 1:
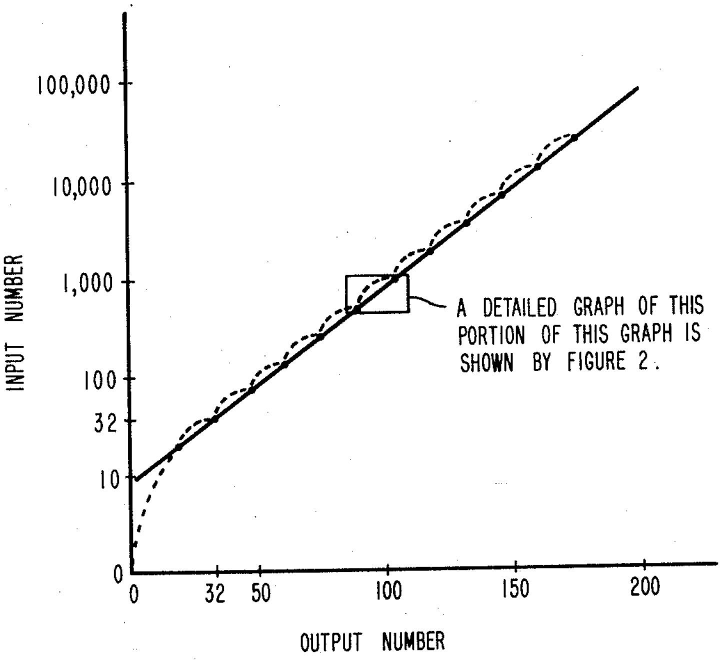
FIG. 1 is a plot on a semilog graph of output numbers versus input numbers of a preferred embodiment of a converter incorporating the features of this invention.

Referring now to the drawings and more particularly to FIG. 1 there is shown a plot on a semilog graph of output numbers versus input numbers for a nineteen to eight digit converter. The plot is the series of dots shown on the semilog graph. From zero to thirty-two the output number is equal to the input number. For input numbers between 32 and 63 there is a change in the output number for every change of two of the input number; that is, input numbers 32 and 33 produce the output number 32, input numbers 34 and 35 produce the output number 33, and so on. Between input numbers 64 and 127 there is a change in the output number for every change of four of the input number; that is, input numbers 64, 65, 66, 67 produce the output number 48, input numbers 68, 69, 70 and 71 produce the output number 49, and so on. This scheme continues so that every time the input number doubles, the input number change necessary to produce a change of output number must also double. For instance, for input numbers between 262144 or ($2^{18}$) and 524287 or ($2^{19}-1$), a change in the input number of 16384 or ($2^{14}$) is required to produce a change of output number.

The straight line on the semilog graph is a line joining all plots for input numbers of $2^n$ where $n$ is any positive integer equal to or greater than 5. It can be seen that the plot undergoes a cycloid-type action about the straight line: the plot only touches the straight line at points where the input numbers are equal to $2^n$. The plot, being almost a straight line, indicates that an output number of the converter is approximately proportional to the logarithm of the corresponding input number.

Figure 2:
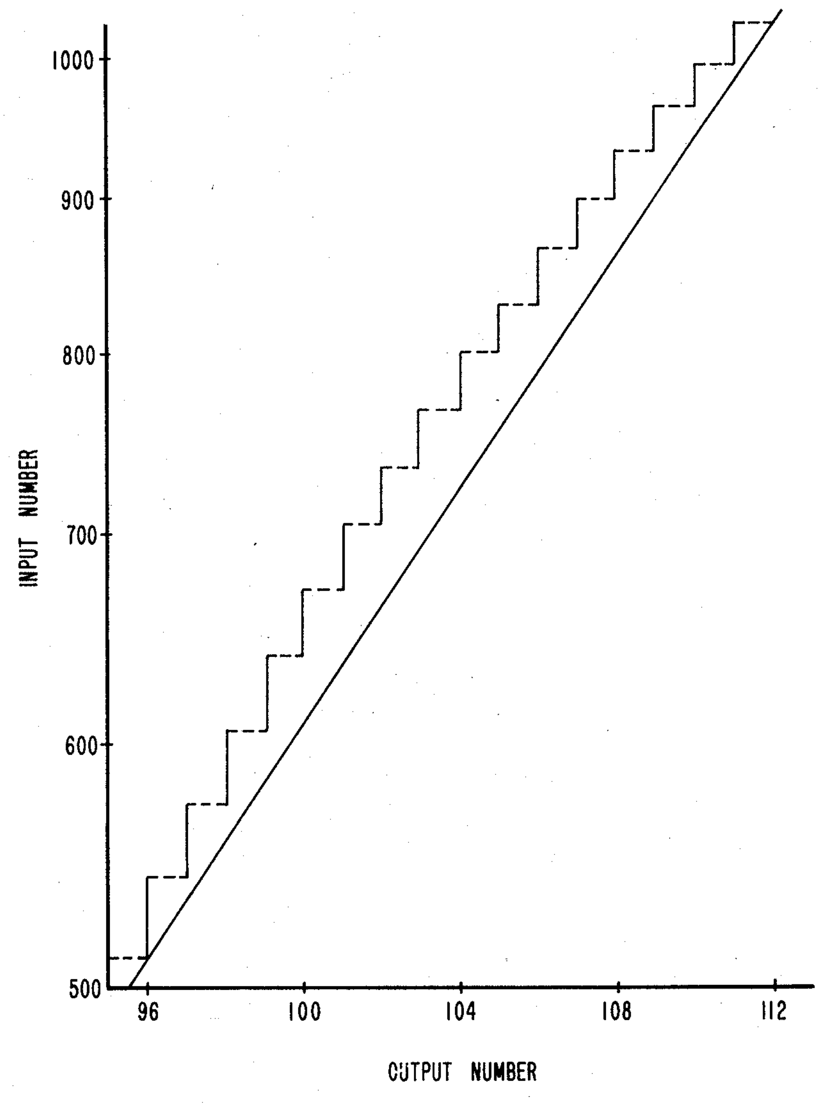
FIG. 2 is a detailed plot of the portion of the graph in the rectangle in FIG. 1.

The rectangle outlined in FIG. 1 encompasses that part of the plot and the straight line for input numbers between $2^n$ and $2^{n+1}$, where $n$ is equal to 9. The details of this portion of the plot and straight line are shown in FIG. 2. The plot of the input number is equal to 512, or $2^n$ where $n$ is 9, lies on the straight line. The corresponding output is 96, or $(n-3)16$. Another plot does not lie on the straight line until the input is equal to 1024, or $2^{n+1}$. The corresponding output is 112, or $(n-2)16$. For input numbers plotted on FIG. 2; that is, input numbers between 512 and 1024, there is a change in the output number for every change of 32 of the input number.

Figure 3:
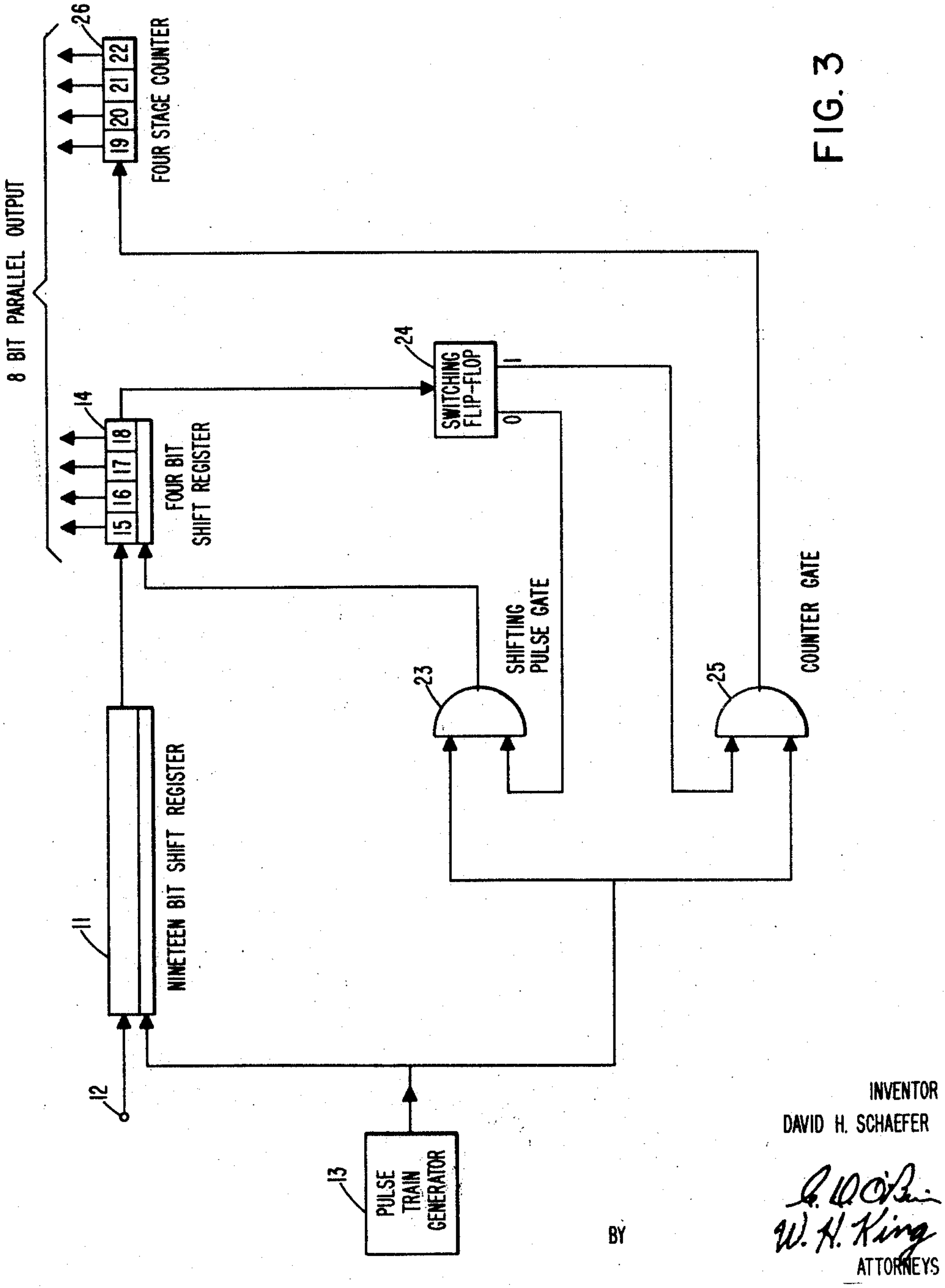
FIG. 3 is a block diagram of a preferred embodiment of a converter incorporating the features of this invention.

Referring to FIG. 3, the input number which is supplied to the converter is applied to input 12 and is stored in the nineteen bit shift register 11, with the most significant digit stored in the last stage to the right of the register. The converter will handle a maximum of 19 digits. If the input number has less than 19 digits, zeros are registered as the most significant digits to make it a 19 digit number.

A source of 19 pulses is applied to register 11, to shifting pulse gate 23, and to counter gate 25 by the pulse train generator 13. Each time a pulse is applied to register 11, the most significant digit is shifted out of register 11 and applied to a four bit shift register 14. Shift register 14 has four stages 15, 16, 17, and 18. Each stage generates a signal which represents the digit stored in it. Shift registers that generate a signal for each of its stages are well known in the computer art. The signals from these four stages are the four least significant bits of the eight bit parallel output.

If the most significant digit shifted out of register 11 is a "1," a pulse is applied to stage 15 of register 14; if the most significant digit shifted out of register 11 is a "0," no pulse is applied to stage 15 of register 14. If pulses from register 11 and shifting pulse gate 23 are simultaneously applied to register 14, a "1" digit is shifted into stage 15 of register 14. Each time a pulse from generator 13 passes through gate 23 and is applied to register 14, the digit ("0" or "1") in each stage is shifted to the next higher stage with the digit in stage 18 being shifted out of register 14 and applied to switching flip-flop 24. When the first "1" digit is shifted out of register 14, it is applied to flip-flop 24 which causes the flip-flop to change state. The shifting pulse gate 23 and the counter gate 25 are both "and" gates. Each of these gates will produce an output pulse or voltage only when pulses or voltages are simultaneously applied to its two inputs.

The switching flip-flop 24 has two states. In its first state, its 0 output produces a "1" and its 1 output produces a "0"; and in its second state, its 0 output produces a "0" and its 1 output produces a "1." Outputs 0 and 1 produce a "1" when they produce a voltage output; and outputs 0 and 1 produce a "0" when they do not produce a voltage output. When a pulse is applied to the input of flip-flop 24, such as when a "1" digit is shifted out of stage 18 of shift register 14, flip-flop 24 changes state.

The output of counter gate 25 is applied to a four stage counter 26 which will give a binary count of all pulses passed through gate 25. The least significant stage of the counter 26 is stage 19, and the most significant stage of the counter is 22, with stages 20 and 21 located therebetween. Each stage generates a signal which represents the digit stored in it. Binary counters which generate signals for each of its stages are well known. The four signals generated by the four stages of counter 26 are the four most significant bits of the eight bit parallel output.

Binary shift registers, flip-flops, "and" gates, pulse train generators, and binary counters which can be used as registers 11 and 14, flip-flop 24, "and" gates 23 and 25, pulse train generator 13, and counter 26 are well known in the digital computing art and are not specifically shown in this specification.

The operation of the converter will be described while referring to FIG. 3. The input number is stored in register 11, flip-flop 24 is initially set to its first state, and stages 15–22 of register 14 and counter 26 are all set to represent a "0." The generator 13 is started and it generates a train of nineteen pulses. The first pulse shifts the most significant bit out of register 11 and applies it to stage 15 of register 14. If this bit is a "0" nothing is applied to stage 15 of register 14; however, if the bit is a "1" a pulse will be applied to stage 15 of register 14. The first pulse from generator 13 will also be applied to gates 23 and 25 and will be passed through only gate 23 because of the state of flip-flop 24.

After the first bit "1" from register 11 is shifted into stage 15 of register 14 by a shifting pulse from gate 23, this first bit "1" is shifted into the next higher stages of register 14 by subsequent shifting pulses. Four shifting pulses after the first bit "1" has been shifted into stage 15 this first bit "1" has propagated completely through register 14 and out of it into flip-flop 24. During this time the second, third, fourth, and fifth bits following the first bit "1" are shifted into stages 18, 17, 16 and 15 respectively of register 14.

The first bit "1" shifted into flip-flop 24 changes the state of the flip-flop, from its first state to its second state, which blocks gate 23 and unblocks gate 25. This action is fast enough to cause gate 25 to pass the pulse which shifted the first bit "1" out of register 14. Therefore, the total number of digits less four of the number stored in register 11 are counted by the counter 26. The four digits not counted are the four present during the transit of the most significant bit "1" through the register 14. The output number then appears as an eight bit parallel output, with the least significant digits stored in stages 15, 16, 17 and 18 and with the most significant digits represented by the digits of the count in counter 26. To convert a new number flip-flop 24 and all stages of register 14 and counter 26 are reset to represent a "0." The reset circuitry is not shown; however, circuitry used for resetting flip-flops, registers, and counter is well known in the computer art.

Obviously numerous modifications and variations of the present invention are possible in the light of the above teachings. For example, other similar schemes can be used to obtain either different accuracies or different ranges. The larger the shift register 14, the more closely the actual value of the input number is known. The larger the counter, the greater the range of input number that can be converted. It is therefore to be understood that within the scope of the appended claims the invention may be practiced otherwise than as specifically described herein.

What is claimed is:

1. A converter for compressing a nineteen or less digit binary number into an eight digit binary number which is approximately equal to the logarithm of the nineteen or less digit binary number where the nineteen or less digit binary number is represented by pulses containing nineteen bits of information and by a group of nineteen clock pulses synchronized with the nineteen bits of information, said converter comprising: a four stage shift register with a signal output for each of its four stages; means connecting the pulses containing the nineteen bits of information to said shift register; a four stage binary counter with a signal output for each of its four stages; shifting pulse gate means connected to apply the group of nineteen clock pulses to said shift register to shift the pulses containing nineteen bits of information into and through the shift register when the shifting pulse gate means is unblocked; counter gate means connected to apply the source of nineteen pulses to said four stage binary counter to be counted when the counter gate means is unblocked; and control means connected between said shift register and said shifting pulse gate means and counter gate means for unblocking said shifting pulse gate means and blocking said counter gate means before the most significant bit is received from said shift register and for blocking said shifting pulse gate means and unblocking said counter gate means when the most significant bit is received from said shift register.

2. A converter for compressing an input binary number into an output binary number which is approximately equal to the logarithm of the input binary number where the input binary number is represented by pulses containing bits of information and by a group of pulses synchronized with said bits of information, said converter comprising: a shift register with a signal output for each of its stages; means connecting the pulses containing bits of information to said shift register; a binary counter with a signal output for each of its stages; shifting pulse gate means connected to apply the group of synchronizing pulses to said shift register to shift the bits of information into and through the shift register when the shifting pulse gate means is unblocked; counter gate means connected to apply the synchronizing pulses to said binary counter to be counted when the counter gate means is unblocked; and control means connected between said shift register and said shifting pulse gate means and counter gate means for unblocking said shifting pulse gate means and blocking said counter gate means before the most significant bit is received from said shift register, and for blocking said shifting pulse gate means and unblocking said counter gate means when the most significant bit is received from said shift register.

3. A converter for compressing a train of pulses representing a nineteen or less digit binary input number into signals representing an eight digit binary output number which is approximately equal to the logarithm of the input number comprising: a fourth stage shift register with a signal output for each of its four stages; means connecting the train of pulses to said shift register; a source of a second train of pulses connected to said shift register for shifting the pulses representing the second, third, fourth, and fifth most significant digits of the input number into said shift register, the output signals generated by each of the four stages of said shift register representing the least significant digits of the output number; a four stage binary counter with a signal output for each of its four stages; and means for applying a number of pulses from said second train of pulses equal to the number of significant digits less four of the nineteen or less input binary number to the counter to be counted, the output signals generated by the stages of the counter representing the most significant digits of the output number.

4. A converter for comprssing a train of pulses representing the digits of a nineteen or less binary input number into signals representing the digits of an eight digit binary number which is approximately equal to the logarithm of the input number comprising: a four stage shift register with a signal output for each of its four stages; means connecting the train of pulses to said shift register; means for connecting a second train of pulses to said shift register for shifting the pulse train representing the digits of the input number into and through said shift register; a four stage binary counter with a signal output for each of its four stages; and means responsive to the first significant digit shifted out of the said shift register for disabling the second mentioned means and for connecting a number of pulses from said second train of pulses equal to the number less four of the significant digits of the input number to the said counter to be counted, whereby the counter generates output signals representing the most significant digits of the output number and the shift register generates output signals representing the least significant digits of the output number.

5. A converter for compressing a many digit binary number to a fewer digit binary number which is related to a nonlinear function of the many digit binary number comprising: a storage means for storing the many digit binary number; a shift register connected to the output of said storage means; a source of a group of clock pulses; means for applying the group of clock pulses to said storage means for serially applying the many digit binary number to said shift register; means for applying the group of clock pulses to said shift register to shift the many digit binary number applied to said shift register into and through said shift register; a binary counter; and means responsive to the first significant digit shifted out of said shift register for disabling said means for applying the group of clock pulses to said shift register, and for applying the remainder of the clock pulses in said group of clock pulses to said counter to be counted, whereby the digits appearing in the counter are the most significant digits of said fewer digit binary number and the digits appearing in the shift register are the least significant digits of the fewer digit binary number.

6. A converter for compressing a nineteen or less digit binary number into an eight digit binary number which is approximately equal to the logarithm of the said nineteen or less digit binary number comprising: a storage means for storing the nineteen or less binary number; a four bit shift register connected to the output of said storage means; a source of a group of nineteen clock pulses; means for applying the group of clock pulses to said storage means for serially applying the many digit number to said shift register; means for applying the group of clock pulses to said shift register to shift the many digit binary number applied to said shift register into and through said shift register; a four stage binary counter; and means responsive to the first significant digit shifted out of said shift register for disabling said means for applying said clock pulses to said shift register and for applying the remainder of said nineteen clock pulses to said counter to be counted, whereby the digits appearing in the counter are the most significant digits of the eight digit output number and the digits appearing in the shift register are the least significant digits of the eight digit output number.

7. A converter for compressing signals representing an input binary number into signals representing an output binary number which is approximately equal to the logarithm of the input number comprising: means for detecting the signals representing the second, third, fourth, and fifth most significant digits of the input number and for generating output signals therefor which represent the least significant digits of the output binary number; and means for counting the number of digits less four of the input binary number and for generating output signals therefor which represent the most significant digits of the output binary number.

8. A converter for compressing signals representing an input number into signals representing an output number which is related to a nonlinear function of the input number comprising: means for detecting the signals representing a consecutive number of the most significant digits other than the first most significant digit of the input number and for generating output signals therefor, these output signals representing the least significant digits of the output number; and means for counting all less a predetermined number of the significant digits of the input number and for generating output signals therefor, these output signals representing the most significant digits of the output number.

References Cited by the Examiner

UNITED STATES PATENTS

| | | | |
|---|---|---|---|
| 3,030,614 | 4/62 | Lehan et al. | 340—347 |
| 3,052,880 | 9/62 | Young et al. | 340—347 |

MALCOM A. MORRISON, *Primary Examiner.*